United States Patent
Botargues et al.

(10) Patent No.: US 8,296,054 B2
(45) Date of Patent: Oct. 23, 2012

(54) METHOD AND DEVICE FOR LIMITING THE NUMBER OF ALARMS GENERATED BY AN ANTI-COLLISION SYSTEM ON BOARD AN AIRPLANE

(75) Inventors: Paule Botargues, Toulouse (FR); Xavier Dal Santo, Blagnac (FR); Pierre Fabre, Tournefeuille (FR); Xavier Guery, Toulouse (FR)

(73) Assignee: Airbus Operations SAS, Toulouse (FR)

(*) Notice: Subject to any disclaimer, the term of this patent is extended or adjusted under 35 U.S.C. 154(b) by 546 days.

(21) Appl. No.: 12/562,808

(22) Filed: Sep. 18, 2009

(65) Prior Publication Data
US 2010/0076686 A1 Mar. 25, 2010

(30) Foreign Application Priority Data
Sep. 23, 2008 (FR) .................................. 08 05211

(51) Int. Cl.
*G06F 17/10* (2006.01)
(52) U.S. Cl. ............ 701/301; 701/23; 701/24; 701/408; 340/468; 340/961; 340/463; 340/471; 340/469; 342/29; 342/30; 342/36; 342/455
(58) Field of Classification Search ................ 701/301; 340/961, 468, 469
See application file for complete search history.

(56) References Cited

U.S. PATENT DOCUMENTS

| | | | | |
|---|---|---|---|---|
| 3,638,092 A * | 1/1972 | Kammerer | ................... | 318/584 |
| 4,710,774 A * | 12/1987 | Gunny | ................... | 342/455 |
| 5,157,615 A * | 10/1992 | Brodegard et al. | ........... | 701/301 |
| 5,181,027 A * | 1/1993 | Shafer | ................... | 340/961 |
| 6,438,492 B1 * | 8/2002 | Le Tallec et al. | ............. | 701/301 |
| 6,804,607 B1 * | 10/2004 | Wood | ................... | 701/301 |
| 2003/0137444 A1 * | 7/2003 | Stone et al. | ................... | 342/30 |
| 2004/0024527 A1 * | 2/2004 | Patera | ................... | 701/301 |
| 2004/0024528 A1 * | 2/2004 | Patera et al. | ................... | 701/301 |
| 2006/0125616 A1 * | 6/2006 | Song | ................... | 340/463 |
| 2007/0182589 A1 * | 8/2007 | Tran | ................... | 340/961 |
| 2008/0021647 A1 * | 1/2008 | Daveze et al. | ................ | 701/301 |
| 2010/0076686 A1 * | 3/2010 | Botargues et al. | ........... | 701/301 |

FOREIGN PATENT DOCUMENTS

| | | |
|---|---|---|
| EP | 0 545 473 | 6/1993 |
| EP | 1 630 766 | 3/2006 |
| FR | 2 876 483 | 4/2006 |
| WO | 96/05562 | 2/1996 |
| WO | 01/46933 | 6/2001 |

OTHER PUBLICATIONS
Preliminary Search Report dated Jul. 10, 2009.

* cited by examiner

*Primary Examiner* — Redhwan K Mawari
(74) *Attorney, Agent, or Firm* — Dickinson Wright PLLC

(57) ABSTRACT

The invention relates to a method and device for limiting the number of alarms generated by an anticollision system on board an airplane according to which the duration of a phase of capture of a setpoint altitude by the airplane is adjusted so that a theoretical time for collision with an intruder aircraft is greater than a predetermined threshold, when the airplane is close to said setpoint altitude and air traffic exists in the environment of said airplane.

9 Claims, 3 Drawing Sheets

METHOD AND DEVICE FOR LIMITING THE NUMBER OF ALARMS GENERATED BY AN ANTI-COLLISION SYSTEM ON BOARD AN AIRPLANE

FIELD OF THE INVENTION

The present invention relates to a method and a device for automatically preventing unnecessary alerts produced by the anticollision systems carried onboard airplanes, upon a change of altitude, as well as an airplane provided with such a device.

BACKROUND OF THE INVENTION

It is known that most airliners are equipped with anticollision systems (generally called TCAS systems for Traffic Collision Avoidance Systems) which make it possible to ensure the safety of air traffic by preventing the risks of in-flight collision.

Thus, when two airplanes are converging toward one another, their anticollision systems calculate an estimate of the collision time and emit an alert informing the crews of each airplane of a possible future collision: such an alert is generally called "traffic advisory" or "TA alert". If appropriate, said anticollision systems emit moreover, for the attention of the crew, an order regarding an avoidance maneuver in the vertical plane so as to get out of the situation in which a collision is possible: such an avoidance maneuver order is generally called "resolution advisory" or "RA alert". The TA and RA alerts are manifested through voice messages and through the displaying of information in flight decks.

In practice, an onboard anticollision system calculates a collision time in the horizontal plane (ratio of the horizontal distance of the two airplanes to their relative horizontal speed) and a collision time in the vertical plane (ratio of the vertical distance of the two airplanes to their relative vertical speed). Said collision times thus calculated are compared with predetermined thresholds for the TA alerts and for the RA alerts (said predetermined thresholds being moreover dependent on the altitude) and said alerts are triggered when said calculated collision times are less than the corresponding predetermined thresholds.

Moreover, it is known that frequently an airplane has to capture (while climbing or descending) a stabilized altitude level neighboring another altitude level allocated to another airplane and that, according to the rules of air navigation, two neighboring stabilized altitude levels are separated by only 300 m (1000 feet).

Hence, because of this small difference in altitude between stabilized altitude levels, the high vertical speed of modern airplanes and the weight of air traffic, said anticollision systems produce numerous TA and RA alerts, even though the airplane, shifting vertically so as to change altitude, is maneuvering correctly without any risk of collision with another airplane. These alerts induce a great deal of stress and are deemed operationally unnecessary by pilots, since the change-of-altitude maneuver is correct and their consideration leads to traffic disruption in most cases.

Moreover, the RA alerts during the altitude capture phases are very numerous and it is estimated that they currently represent more than 50% of the total of these alerts in European space, this percentage being apt to increase in the future owing to the expansion of air traffic.

SUMMARY OF THE INVENTION

The object of the present invention is to remedy this drawback.

To this end, by virtue of the invention, the method for limiting the number of alerts emitted by an anticollision system on board an airplane which performs a change-of-altitude maneuver comprising a phase of capture of a setpoint altitude, said anticollision system being able to detect an intruder aircraft situated in the aerial environment of said airplane, to calculate a theoretical collision time between said airplane and said intruder aircraft and to emit at least one alert when this theoretical collision time is less than a predetermined threshold, is noteworthy in that, when said airplane is close to said setpoint altitude and air traffic exists in the environment of said airplane, the duration of said capture phase is adjusted so that said theoretical collision time is greater than said predetermined threshold.

Thus, by keeping the theoretical collision time greater than said predetermined threshold by adjusting the duration of the capture phase, the untimely triggering of unnecessary, or indeed even detrimental, alerts is avoided, without however endangering the safety of said airplane and of the intruder aircraft.

The duration of said capture phase can be adjusted by controlling the vertical speed of said airplane. Such control can for example consist in keeping said vertical speed below a speed threshold, thereby making it possible in this case to lengthen the duration of the capture phase.

As a variant or supplement, the duration of said capture phase can also be adjusted through advanced commencement of the latter.

According to the invention, said airplane can be considered to be close to said setpoint altitude when the absolute value of the difference of said setpoint altitude and of the current altitude of said airplane is less than a height threshold representative of the zone of occurrence of said alert.

Furthermore, according to the invention, air traffic is considered to exist in the environment of said airplane when:
  either the configuration of capture of said setpoint altitude by the airplane is similar to a reference capture configuration liable to trigger at least one unnecessary alert;
  or said theoretical collision time is less than said predetermined threshold increased by a temporal margin. Thus, it is possible to advance the triggering of an alert with the margin on the predetermined threshold. This condition can optionally be combined with the previous one;
  or at least one alert is emitted by said anticollision system of the airplane, this condition possibly being combined with the first.

Moreover, the invention relates to a device for the implementation of the method described above making it possible to limit the number of alerts emitted by an anticollision system on board an airplane which performs a change-of-altitude maneuver comprising a phase of capture of a setpoint altitude, said anticollision system being able to detect an intruder aircraft situated in the aerial environment of said airplane, to calculate a theoretical collision time between said airplane and said intruder aircraft and to emit at least one alert when this theoretical collision time is less than a predetermined threshold.

According to the invention, the device comprises:
  activatable control means for automatically adjusting the duration of the capture phase so that said theoretical collision time is greater than said predetermined threshold; and
  activation means able to automatically receive information from said anticollision system and to activate said control means when said airplane is close to said setpoint altitude and air traffic exists in the environment of said airplane.

Furthermore, the control means for adjusting the duration of the capture phase can for example establish a vertical speed order intended for a flight computer of the airplane controlling its longitudinal-control surfaces and/or its engines, and/or trigger in advance the setpoint altitude capture phase, thereby increasing the setpoint altitude capture time.

The invention also relates to an aircraft provided with a device such as mentioned above.

The figures of the appended drawing will elucidate the manner in which the invention may be embodied. In these figures, identical references denote similar elements.

DETAILED DESCRIPTION OF THE INVENTION

Figure 1:
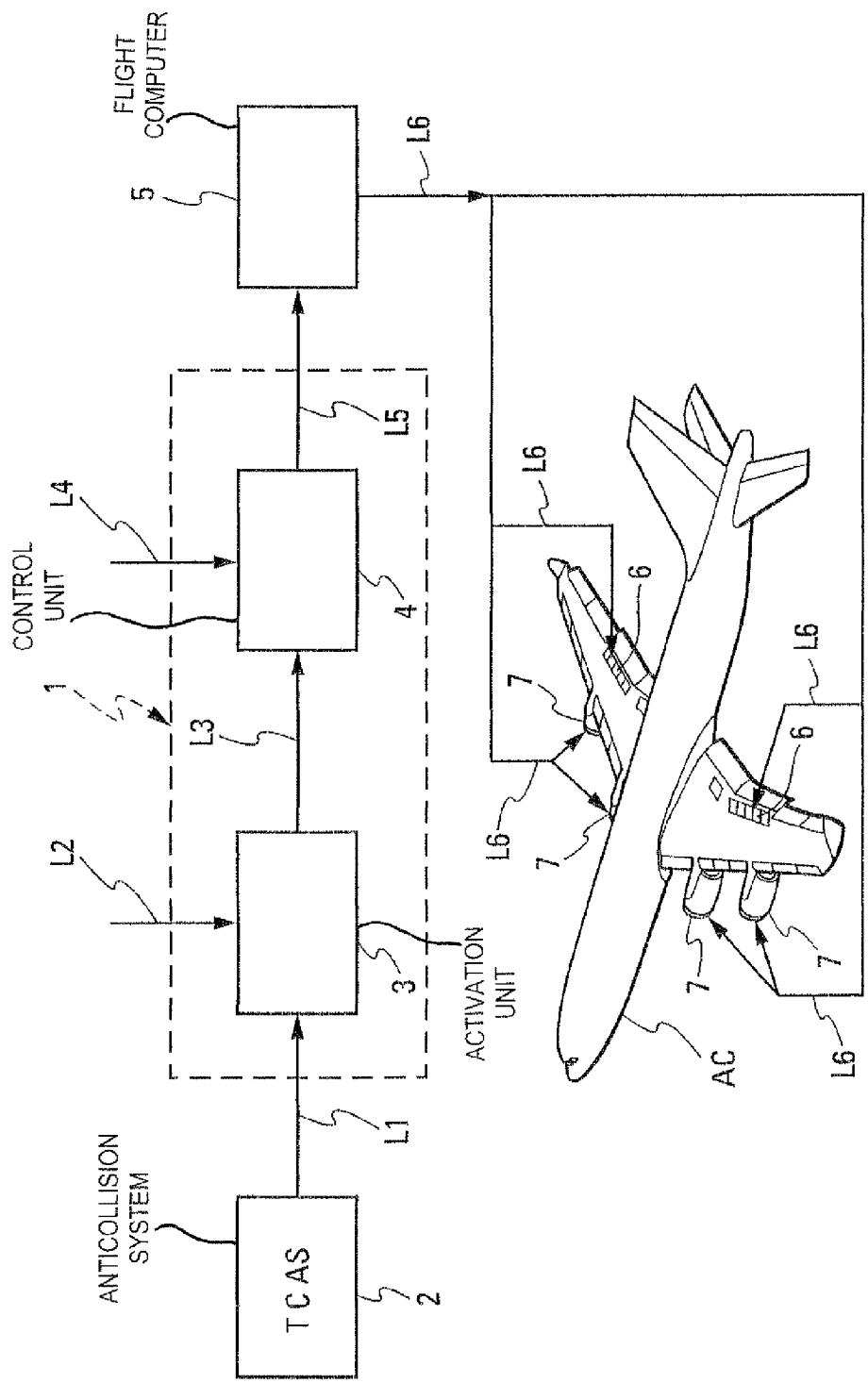
FIG. 1 is a schematic diagram of a device in accordance with the invention making it possible to limit the alerts emitted by an anticollision system on board an airplane AC.

Represented in schematic form in FIG. 1 is a device 1, in accordance with the invention, carried onboard an airplane AC. Such a device 1 is intended to limit the number of alerts emitted by a TCAS anticollision system 2 on board the airplane AC, when the latter performs a change-of-altitude maneuver to capture a setpoint altitude Zc. In this figure, the device 1, the anticollision system 2 and a flight computer 5 are represented outside the airplane AC, although, in reality, they are on board the latter.

In a customary manner, the anticollision system 2 is able to detect an intruder aircraft in the environment of said airplane AC, to calculate a theoretical time for collision $t_{col}$ between the latter and said intruder aircraft and to emit an alert for the attention of the crew of the airplane AC in the case where said theoretical collision time is less than a predetermined threshold.

As shown by FIG. 1, such a device 1 comprises:
activation means 3, connected to the anticollision system 2 of the airplane AC by way respectively of the link L1. These activation means 3 thus receive information relating to the intruder aircraft (for example its altitude). They also receive, by way of the link L2, information relating to the airplane AC (for example its vertical speed, its altitude, etc.) originating from its various onboard measurement instruments (not represented). When engagement conditions (detailed subsequently) are met, the activation means 3 are able to automatically activate control means 4; and
the control means 4, which are connected to the activation means 3 by way of the link L3. They receive, by way of the link L4, data representative of the state of said airplane AC. When they are activated by the activation means 3, the control means 4 can determine a vertical speed order (in the manner described hereinafter) to be applied to the airplane AC so as to avoid the triggering of an alert and can transmit it to the flight computer 5 of the airplane AC. As a variant or supplement, after having been activated by the activation means 3, the control means 4 can trigger in an advanced manner the setpoint altitude Zc capture phase.

The flight computer 5, connected in particular to the control means 4 by way of the link L5, is able to deliver control orders, by way of the links L6, for example to the actuators of the surfaces 6 allowing the longitudinal control of the airplane AC (elevators, airbrakes) and/or to the engines 7 of said airplane, so as to apply the vertical speed order determined by the control means 4.

Figure 2A:
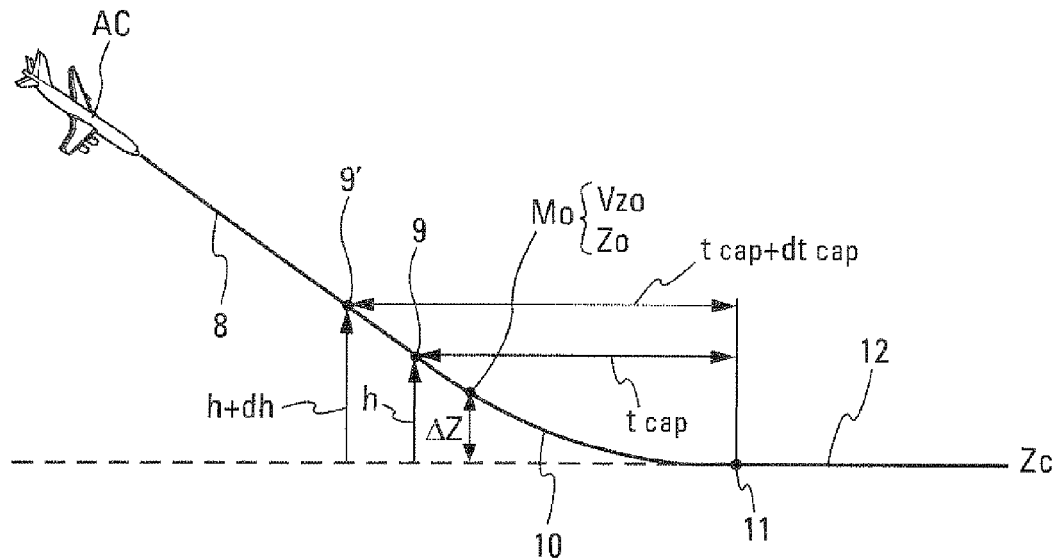
FIGS. 2A and 2B represent in schematic form the airplane AC during a change-of-altitude maneuver with a setpoint altitude capture, respectively in the descent phase (FIG. 2A) and in the climb phase (FIG. 2B).
Figure 2B:
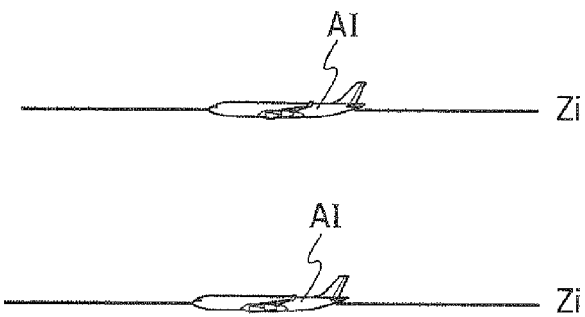
Figure 2B:
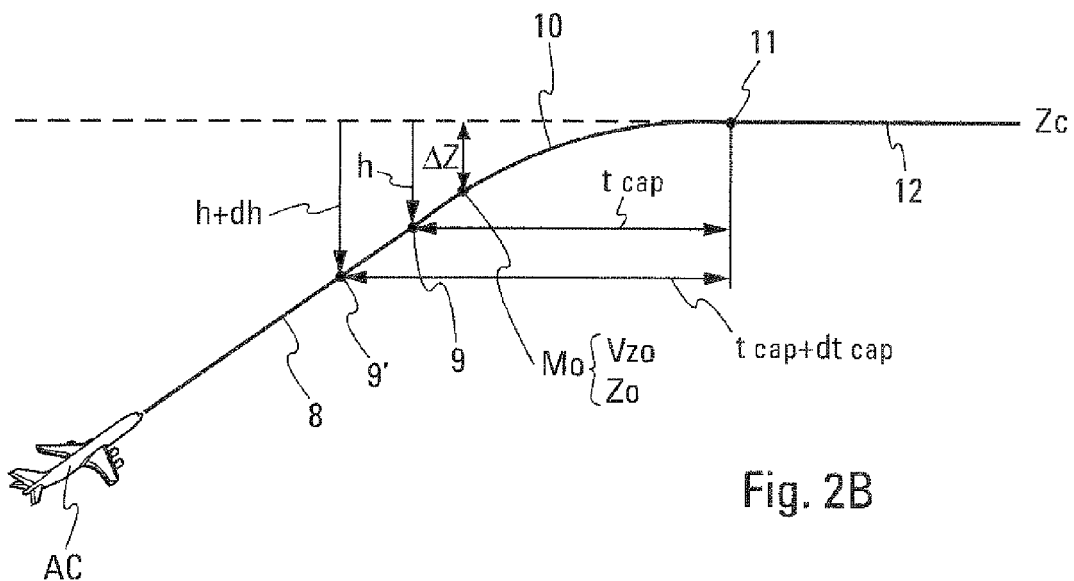

Schematically represented in FIGS. 2A and 2B is the airplane AC in the course of a change-of-altitude maneuver with capture of a setpoint altitude Zc, respectively while descending (FIG. 2A) and climbing (FIG. 2B). As represented, such a change-of-altitude maneuver comprises the following three successive phases:
a descent (or climb) phase, in the course of which the approach trajectory 8 of the airplane AC is substantially rectilinear and is traveled at a substantially constant vertical speed up to a point 9 situated at a height h above (or below) the setpoint altitude Zc to be attained;
an altitude capture phase, in the course of which the capture trajectory 10 of the airplane AC is rounded out, for example parabolic, and becomes tangential at 11 to the setpoint altitude Zc; and
a stabilization phase, in the course of which the trajectory 12 of the airplane AC follows said setpoint altitude Zc.

The altitude capture time $t_{cap}$ corresponds to the flight time of the airplane AC on the trajectory 10, between the points 9 and 11. It is determined by the altitude capture law automatically piloting the maneuver.

Although the airplane AC correctly executes its setpoint altitude Zc capture and there is no risk of collision with an intruder aircraft AI, it is possible that the anticollision system 2 of said airplane AC may emit an alert, for example because it has detected such an intruder aircraft AI beyond the setpoint altitude Zc. Such an alert is therefore unnecessary, and even detrimental and the object of the present invention is therefore to eliminate it. Accordingly, said airplane AC is slowed down in its setpoint altitude Zc capture, for example by acting on the longitudinal control surfaces and/or the speed of the engines of said airplane AC.

By assuming, as is represented in FIGS. 2A and 2B, that:
the airplane AC is situated at a point Mo of the capture trajectory 10 corresponding to an altitude Zo, which differs from the setpoint altitude Zc by a height ΔZ, the vertical speed of said airplane AC being equal to Vzo at the point Mo;
the altitude of the intruder aircraft AI is equal to Zi; and
the predetermined threshold of the anticollision system of the airplane AC (for example the RA alert threshold) is then denoted by S,
the prevention of an alert will be achieved if the absolute value of the ratio $|(Zi-Zo)/Vzo|$ is greater than said threshold S (i.e. $|(Zi-Zo)/Vzo|>S$), that is to say if Vzo is less than the ratio $|Zi-Zo|/S$ (i.e. $Vzo<|Zi-Zo|/S$).

Thus, the vertical speed Vzo of the airplane AC, making it possible to prevent anticollision alerts, can be estimated at each instant as a function of the altitude Zo of the airplane AC (known by the onboard altimeters), of the altitude Zi of the intruder aircraft AI (determined by the anticollision system of the airplane AC) and of said threshold S of said anticollision system.

If, in accordance with the aerial separation rules in force, the altitude Zi of the intruder aircraft AI is separated by 300 m (1000 feet) from the setpoint altitude Zc, the vertical speed Vzo of the airplane AC must be less than $(\Delta Z+300)/S$ (i.e. $Vzo<(\Delta Z+300)/S$).

As a variant of or supplement to the foregoing, and as also represented in FIGS. 2A and 2B, a slowing down of the airplane AC in its capture of the setpoint altitude Zc can moreover be obtained by advancing the capture of the setpoint altitude Zc, that is to say by triggering the phase of capturing the altitude Zc at a point 9' of the approach trajectory 8 of height h+dh greater than the height h of the point 9. The capture time is then increased by $dt_{cap}$ with respect to the capture time $t_{cap}$.

After such an advance, the vertical speed Vzo of the airplane AC can be limited in the manner described above.

It will be noted that, though the method in accordance with the present invention described with regard to FIGS. 2A and 2B makes it possible to eliminate unnecessary alerts, on the other hand it considerably lengthens the time required by the airplane AC to attain the setpoint altitude Zc.

Hence, according to another aspect of the present invention, the process for slowing down said airplane AC is limited to engagement conditions that are judiciously defined so as to avoid the systematic lengthening of all the altitude capture maneuvers.

Thus, according to a preferred embodiment of the invention, the process for slowing down the airplane AC is implemented when the following engagement conditions are simultaneously met:

a first condition relating to the proximity of the airplane AC in relation to the setpoint altitude Zc to be attained. Assuming that, at an instant t, the airplane AC is situated at a current altitude Z(t) and is following the approach trajectory 8 (climb or descent phase preceding the capture phase) or else the capture trajectory 10, the first condition is met when the absolute value of the difference of the setpoint altitude Zc and of the current altitude Z(t) of the airplane Z(t) is less than a height threshold $S_h$ (i.e. $|Zc-Z(t)|<S_h$), the height threshold $S_h$ being representative of the zone of occurrence of the TA and RA alerts during a descent (or climb) phase preceding the altitude Zc capture phase or during the capture phase itself. Thus, this first condition makes it possible to restrict the engagement of the slowdown process to the aforesaid phases, in the course of which it is preferable to reduce the vertical speed of the airplane AC because said speed could potentially generate TA or RA alerts; and a second condition relating to air traffic in a predetermined zone surrounding said airplane AC. This second condition makes it possible to restrict the engagement of the process for slowing down said airplane AC solely when the proximity with an intruder aircraft Al justifies a vertical speed reduction. It may involve various items of information provided by the TCAS anticollision system (TA alert and RA alert, data relating to the intruder aircraft Al).

Thus, in a first exemplary embodiment, the TCAS anticollision system determines the following information:

the presence or otherwise of an intruder aircraft Al in a predetermined detection zone, for example a rectangular zone centered on the airplane AC and defined by a vertical side of 3600 m (18000 feet) and a horizontal side of 55 km (30 nautical miles);

and, should an intruder aircraft Al be detected in said detection zone, parameters associated with said intruder aircraft Al (relative altitude, vertical speed, etc.)

The analysis of the aforesaid information provided by the anticollision system 2 makes it possible to characterize the configuration of capture of the setpoint altitude Zc by the airplane AC as a function of the intruder aircraft. This capture configuration is then compared with reference capture configurations, which require the triggering of the process for slowing down said airplane AC to prevent unnecessary TA alerts (and a fortiori RA alerts).

Thus, in this first exemplary embodiment, the second condition is satisfied when the configuration of capture of the setpoint altitude Zc by the airplane AC is similar to one of the aforesaid reference configurations.

Figure 3:
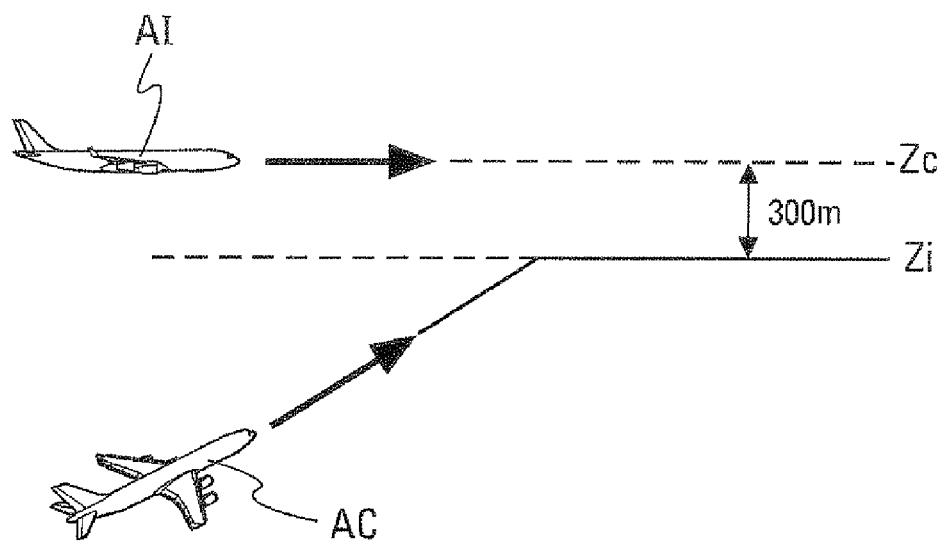
FIGS. 3 and 4 each illustrate, in a schematic manner, an example of a reference configuration of capture of the setpoint altitude by the airplane AC in accordance with the invention.

As shown by FIG. 3, a reference configuration can be characterized by:

an intruder aircraft Al in level flight at a stabilized altitude level Zi;

the airplane AC in the climb phase (or descent phase in a variant of this configuration, not represented in FIG. 3) converging towards this intruder aircraft Al; and the setpoint altitude Zc situated 300 m (1000 feet) below (or above in the variant) the stabilized altitude level Zi.

Figure 4:
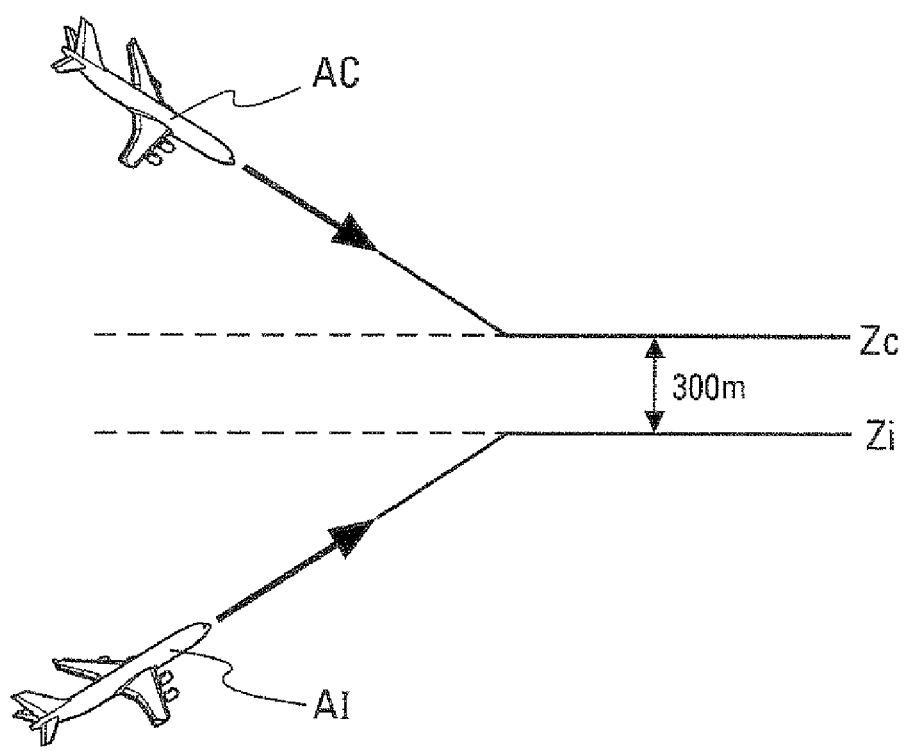

Furthermore, in FIG. 4, another reference configuration has been represented which can be characterized by:

an intruder aircraft Al in the climb phase (or descent phase in a variant of this configuration, not represented in FIG. 4);

the airplane AC in the descent phase (or climb phase in the variant) converging towards the intruder aircraft Al;

the setpoint altitude Zc situated between the airplane AC and the intruder aircraft Al; and the setpoint altitude Zi of the aircraft Al situated 300 m (1000 feet) below (or above in the variant) the setpoint altitude level Zc.

As a variant or supplement, in a second exemplary embodiment, the second condition is satisfied when the theoretical collision time $t_{col}$ (described above) is less than the threshold S (for example the TA alert threshold) increased by a margin T (i.e. $t_{col}<(S+T)$). Thus, it is possible to advance a TA alert with a margin T on the alert threshold S.

Of course, it is conceivable to combine the second conditions of the first and of the second exemplary embodiments, so as to form a new second condition that is met when the configuration of capture of the airplane AC is similar to a reference configuration and the theoretical collision time $t_{col}$ is such that $t_{col}<(S+T)$.

Moreover, in a variant of the preferred embodiment, the second condition relating to the air traffic is satisfied as soon as a TA alert is emitted by the anticollision system 2, thereby making it possible only to prevent the emission of RA alerts.

The invention claimed is:

1. A method for limiting alerts emitted by an anticollision system on board an airplane which performs a change-of-altitude maneuver, the method comprising the steps of:

detecting, by said anticollision system, an intruder aircraft situated in an aerial environment of said airplane, during a capture phase of a flight trajectory of the airplane, with the flight trajectory having a setpoint altitude (Zc);

calculating a theoretical collision time ($t_{col}$) between said airplane and said intruder aircraft; and emitting at least one alert when the calculated theoretical collision time ($t_{col}$) is less than a predetermined threshold (S), wherein, during said capture phase, the duration of flight of the airplane along the flight trajectory within said capture phase is adjusted so that said calculated theoretical collision time ($t_{col}$) is greater than said predetermined threshold (S).

2. The method as claimed in claim 1, is
wherein the duration of the flight of the airplane in said capture phase is adjusted by controlling vertical speed (Vzo) of said airplane.

3. The method as claimed in claim 1,
wherein the duration of the flight of the airplane in said capture phase is adjusted by advancing commencement of the capture phase of the flight trajectory of the airplane.

4. The method as claimed in claim 1,
wherein the duration of the flight of said airplane in the capture phase is adjusted when an absolute value of a difference between said setpoint altitude (Zc) and a current altitude (Z(t)) of said airplane is less than a predetermined height threshold ($S_h$).

5. The method as claimed in claim 1, wherein the adjusting of said duration of said capture phase of the airplane is triggered according to a capture configuration of said setpoint altitude (Zc), as a function of the intruder aircraft, and comparing the capture configuration with a reference capture configuration.

6. The method as claimed in claim 1,
wherein the at least one alert is emitted when said calculated theoretical collision time ($t_{col}$) is less than said predetermined threshold (S) increased by a temporal margin (T), represented as $t_{col}<(S+T)$.

7. The method as claimed in claim 1,
wherein the at least one alert is emitted by said anticollision system of the airplane.

8. A system for limiting alerts emitted by an anticollision system on board an airplane which performs a change-of-altitude maneuver, the system comprising:
said anticollision system, wherein said anticollision system is configured:
to detect an intruder aircraft situated in an aerial environment of said airplane, during a capture phase of a flight trajectory of the airplane, with the flight trajectory having a setpoint altitude (Zc),
to calculate a theoretical collision time ($t_{col}$) between said airplane and said intruder aircraft during said capture, and
to emit at least one alert when the calculated theoretical collision time is less than a predetermined threshold (S), and
an alert limiting device connected to the anticollision system, which device comprises:
an activatable control unit configured to adjust duration of the capture phase so that the calculated theoretical collision time ($t_{col}$) is greater than said predetermined threshold (S), and
an activation unit configured to automatically receive information from said anticollision system and to activate said activatable control unit, during said capture phase, and intruder aircraft engagement conditions exist.

9. An airplane,
which comprises the system of claim 8.

* * * * *